United States Patent
Sealey, II et al.

(10) Patent No.: US 12,350,878 B2
(45) Date of Patent: Jul. 8, 2025

(54) MANUFACTURING PROCESS FOR PAPERMAKING BELTS USING 3D PRINTING TECHNOLOGY

(71) Applicant: STRUCTURED I, LLC, Great Neck, NY (US)

(72) Inventors: James E. Sealey, II, Belton, SC (US); Byrd Tyler Miller, IV, Easley, SC (US); Justin C. Pence, Williamston, SC (US); Taras Z. Andrukh, Greenville, SC (US); Shane Ervin Hayes, Anderson, SC (US)

(73) Assignee: STRUCTURED I, LLC, Great Neck, NY (US)

( * ) Notice: Subject to any disclaimer, the term of this patent is extended or adjusted under 35 U.S.C. 154(b) by 0 days.

(21) Appl. No.: 18/227,390

(22) Filed: Jul. 28, 2023

(65) Prior Publication Data

US 2023/0364854 A1  Nov. 16, 2023

Related U.S. Application Data

(60) Continuation of application No. 16/862,784, filed on Apr. 30, 2020, now Pat. No. 11,752,688, which is a continuation of application No. 15/959,925, filed on Apr. 23, 2018, now Pat. No. 10,675,810, which is a
(Continued)

(51) Int. Cl.
| | |
|---|---|
| *B29C 64/112* | (2017.01) |
| *B29C 64/106* | (2017.01) |
| *B29C 64/118* | (2017.01) |
| *B33Y 80/00* | (2015.01) |
| *D21F 1/00* | (2006.01) |
| *D21F 11/00* | (2006.01) |
| *B29L 31/00* | (2006.01) |
| *B33Y 10/00* | (2015.01) |

(52) U.S. Cl.
CPC .......... *B29C 64/112* (2017.08); *B29C 64/106* (2017.08); *B29C 64/118* (2017.08); *B33Y 80/00* (2014.12); *D21F 1/0027* (2013.01); *D21F 1/0063* (2013.01); *D21F 11/006* (2013.01); *B29L 2031/733* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 7,032,625 | B2 * | 4/2006 | Rydin | D21F 7/10 139/383 A |
| 7,236,166 | B2 * | 6/2007 | Zinniel | B33Y 30/00 264/340 |

(Continued)

*Primary Examiner* — Dennis R Cordray
(74) *Attorney, Agent, or Firm* — Amster, Rothstein & Ebenstein LLP

(57) ABSTRACT

A papermaking belt including zones of material laid down successively using a 3D printing process. The zones include at least a pocket zone configured to form three dimensional structures in a paper web by applying vacuum to pull the paper web against the pocket zone. In at least one exemplary embodiment, the zone also include at least one vacuum breaking zone configured to limit an amount of paper fibers pulled through the pocket zone by the applied vacuum.

20 Claims, 6 Drawing Sheets

Related U.S. Application Data division of application No. 14/961,249, filed on Dec. 7, 2015, now Pat. No. 10,099,425.

(60) Provisional application No. 62/240,924, filed on Oct. 13, 2015, provisional application No. 62/088,095, filed on Dec. 5, 2014.

(56) References Cited

U.S. PATENT DOCUMENTS

| | | | | |
|---|---|---|---|---|
| 7,493,923 B2* | 2/2009 | Barrett | .................... | D21F 11/14 |
| | | | | 162/348 |
| 7,744,726 B2* | 6/2010 | Scherb | .................... | D21F 11/14 |
| | | | | 162/308 |
| 2005/0280184 A1* | 12/2005 | Sayers | .................. | D21F 1/0027 |
| | | | | 264/308 |

* cited by examiner

MANUFACTURING PROCESS FOR PAPERMAKING BELTS USING 3D PRINTING TECHNOLOGY

RELATED APPLICATIONS

This application is a continuation of and claims priority to and the benefit of U.S. patent application Ser. No. 16/862,784, filed Apr. 30, 3030, which in turn is a continuation of and claims priority to and the benefit of U.S. patent application Ser. No. 15/959,925, filed Apr. 23, 2018, now U.S. Pat. No. 10,675,810, which in turn is a divisional of and claims priority to and the benefit of U.S. patent application Ser. No. 14/961,249, filed Dec. 7, 2015, now U.S. Pat. No. 10,099,425, which in turn is a non-provisional based on U.S. Provisional Patent Application No. 62/240,924, filed Oct. 13, 2015 and U.S. Provisional Patent Application No. 62/088,095, filed Dec. 5, 2014, the contents of which are incorporated herein by reference in their entirety.

FIELD OF THE INVENTION

This invention relates to the manufacturing process of belts used in papermaking processes.

BACKGROUND

Tissue papermaking is a complex process where specific control over product quality attributes is critical. Arguably, the most critical pieces of equipment used to control these quality attributes are the fabrics utilized on the papermaking machines. The various papermaking machine technologies are conventional dry crepe, through air drying (TAD), or hybrid technologies such as Metso's NTT, Georgia Pacific's ETAD, or Voith's ATMOS process. All these technologies utilize fabrics at various stages in the process to influence tissue web properties and overall asset productivity.

The predominant manufacturing method for making a tissue web is the conventional dry crepe process. The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for even fiber formation when deposited from the machine headbox into the forming section. There are many types of forming sections used in conventional papermaking (inclined suction breast roll, twin wire C-wrap, twin wire S-wrap, suction forming roll, and Crescent formers) but all are designed to retain the fiber, chemical, and filler recipe while allowing the water to drain from the web. In order to accomplish this, fabrics are utilized.

Forming fabrics are woven structures that utilize monofilaments (yarns, threads) composed of synthetic polymers (usually polyethylene, polypropylene, or nylon). The forming fabric has two surfaces: the sheet side and the machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

In order to control other properties such as: fabric stability, life potential, drainage, fiber support, and clean-ability, different weave patterns are utilized. Generally, forming fabrics are classified by the number of layers utilized in their construction. There are three basic styles of forming fabrics: single layer, double layer, and triple layer. A single layer fabric is composed of one CD (shute) and one MD (warp) yarn system. The main problem of single layer fabrics is lack of dimensional stability. The double layer forming fabric has one layer of warp yarns and two layers of shute yarns. This multilayer fabric is generally more stable and resistant to stretching. Triple layer fabrics have two separate single layer fabrics bound together by separated yarns called binders. Usually the binder fibers are placed in cross direction but also can be oriented in the machine direction. Triple layer fabrics have further increased dimensional stability, wear potential, drainage, and fiber support as compared to single or double layer fabrics.

The conventional manufacturing of forming fabrics includes the following operations: weaving, initial heat setting, seaming, final heat setting, and finishing. The fabric is made in a loom using two interlacing sets of monofilaments (or threads or yarns). The longitudinal threads are called the warp and the transverse called shute threads. After weaving, the forming fabric is heated to relieve internal stresses to enhance dimensional stability of the fabric. The next step in manufacturing is seaming. This step converts the flat woven fabric into an endless forming fabric by joining the two MD ends of the fabric. After seaming, the final heat setting is applied to stabilize and relieve the stresses in the seam area. The final step in the manufacturing process is finishing, where the fabric is cut to width and sealed.

There are several parameters and tools used to characterize the properties of the forming fabric: mesh and count, caliper, frames, plane difference, open area, air permeability, void volume and distribution, running attitude, fiber support, drainage index, and stacking. None of these parameters can be used individually to precisely predict the performance of a forming fabric on a paper machine, but together the expected performance and sheet properties can be estimated.

After web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and Yankee dryer. The press fabric is permeable fabric designed to uptake water from the web as it is pressed in the press section. It is composed of large monofilaments or multi-filamentous yarns, needled with fine synthetic batt fibers to form a smooth surface for even web pressing against the Yankee dryer.

After pressing the sheet, between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. If the process is a wet crepe process, the web must be conveyed between dryer fabrics through steam heated after-dryer cans to dry the web to the required finished moisture content. After creping, the web is optionally calendered and reeled into a parent roll and ready for the converting process.

The through air dried (TAD) process is another manufacturing method for making a tissue web. The major steps of the through air dried process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding) This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are; therefore, critical to the development of web softness. The manufacturing method of an imprinting fabric is similar to a forming fabric, expect for the addition of an overlaid polyme. These type of fabrics are disclosed in patents such as U.S. Pat. Nos. 5,679,222; 4,514,345; 5,334,289; 4,528,239; and 4,637,859, the disclosures of which are hereby incorporated by reference in their entirety. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder though a very low intensity nip (up to 10 times less than a conventional press nip) between a solid pressure roll and the steam heated cylinder. The only portions of the web that are pressed between the pressure roll and steam cylinder rest on knuckles of the structured fabric; thereby, protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process. Some TAD machines utilize fabrics (similar to dryer fabrics) to support the sheet from the crepe blade to the reel drum to aid in sheet stability and productivity. Patents which describe creped through air dried products include U.S. Pat. Nos. 3,994,771; 4,102,737; 4,529,480; and 5,510,002.

A variation of the TAD process where the sheet is not creped, but rather dried to up to 99% using thermal drying and blown off the structured fabric (using air) to be optionally calendered and reeled also exits. This process is called UCTAD or un-creped through air drying process. U.S. Pat. No. 5,607,551 describes an uncreped through air dried product.

A new process/method and paper machine system for producing tissue has been developed by the Voith GmbH (Heidenheim, Germany) and is being marketed under the name ATMOS. This process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as a conventional or TAD machine would utilize. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. The first patented belt press configurations used in conjunction with a structured fabric is U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, into the vacuum roll enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile, (see FIG. 28 in U.S. Pat. No. 7,951,269 or 8,118,979 or FIG. 20 of U.S. Pat. No. 8,440,055) or a press roll (see FIG. 29 in U.S. Pat. No. 7,951,269 or 8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673, 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, with FIG. 1 showing the arrangement. Rather than sending the web through a second press after the belt press, the web can travel through a boost dryer (FIG. 15 of U.S. Pat. No. 7,387,706 or 7,351,307), a high pressure through air dryer (FIG. 16 of U.S. Pat. No. 7,387,706 or 7,351,307), a two pass high pressure through air dryer (FIG. 17 of U.S. Pat. No. 7,387,706 or 7,351,307) or a vacuum box with hot air supply hood (FIG. 2 of U.S. Pat. No. 7,476,293). U.S. Pat. Nos. 7,510,631, 7,686,923, 7,931,781 8,075,739, and 8,092,652 further describe methods and systems for using a belt press and structured fabric to make tissue products each having variations in fabric designs, nip pressures, dwell times, etc. and are mentioned here for reference. A wire turning roll can also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. No. 8,303,773), a through drilled (bored) and blind drilled (blind bored) pressure roll (FIG. 9 of U.S. Pat. No. 8,303,773), or a shoe press (U.S. Pat. No. 7,905,989). After the web leaves this press element to the steam heated cylinder, the % solids are in the range of 40-50%. The steam heated cylinder is coated with chemistry to aid in sticking the sheet to the cylinder at the press element nip and also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, creping, is similar to that of TAD with only the knuckle sections of the web being creped. Thus the dominant surface topography is generated by the structured fabric, with the creping process having a much smaller effect on overall so less as compared to conventional dry crepe.

The web is now calendered (optional,) slit, and reeled and ready for the converting process.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process. The ETAD process and products can be viewed in U.S. Pat. Nos. 7,339,378, 7,442,278, and 7,494,563. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a Yankee dryer where it can be optionally dried with a hot air impingement hood, creped, calendared, and reeled. The NTT process and products can be viewed in international patent application publication WO 2009/061079 A1. The process has several embodiments, but the key step is the pressing of the web in a nip formed between a structured fabric and press felt. The web contacting surface of the structured fabric is a non-woven material with a three dimensional structured surface comprised of elevations and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendared, and reeled.

As shown in the aforementioned discussion of tissue papermaking technologies, the fabrics utilized are critical in development of the tissue web's structure and topography which are instrumental in the quality characteristics of the web such as softness (bulk softness and surfaces smoothness) and strength (tensile). The manufacturing process for making these fabrics has been limited to weaving a fabric (primarily forming fabrics and imprinting/structured fabrics) or a base structure upon which synthetic fibers are needled (press fabrics) or overlaid with a polymeric resin (overlaid imprinting/structured fabrics).

SUMMARY OF THE INVENTION

An object of the present invention is to provide a manufacturing process for belts used in papermaking processes, and more specifically to provide a process of using three dimensional printing technology (3D-printing) to produce belts used in tissue paper production.

Another object of the present invention is to provide a manufacturing process for papermaking belts in which polymers of specific material properties are laid down in an additive manner under computer control to create belts with unique structural and topographical profiles.

Another object of the present invention is to allow for selective depositing of preferred polymer materials across the belt structure advantageously.

Another object of the present invention is to allow for blending of polymers in defined zones to provide functionality not capable with conventional belt-making processes. The printing process allows each element of the belt to be designed in localized areas.

According to an exemplary embodiment of the present invention, a method for making a three dimensional papermaking belt configured for use in forming, pressing, drying or molding of fibrous web, comprises forming the belt by 3D printing.

According to another exemplary embodiment of the present invention, a method of making a papermaking belt comprises: laying down successive layers of material using a 3D printing process so as to form a unitary structure with zones corresponding to the successive layers, wherein the zones comprise: a pocket zone configured to form three dimensional structures in a paper web by applying vacuum to pull the paper web against the pocket zone; and at least one vacuum breaking zone configured to limit an amount of paper fibers pulled through the pocket zone by the applied vacuum.

A papermaking belt according to an exemplary embodiment of the present invention comprises: zones of material laid down successively using a 3D printing process, wherein the zones comprise: a pocket zone configured to form three dimensional structures in a paper web by applying vacuum to pull the paper web against the pocket zone; and at least one vacuum breaking zone configured to limit an amount of paper fibers pulled through the pocket zone by the applied vacuum.

Other features and advantages of embodiments of the invention will become readily apparent from the following detailed description, the accompanying drawings and the appended claims.

DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

Figure 1:
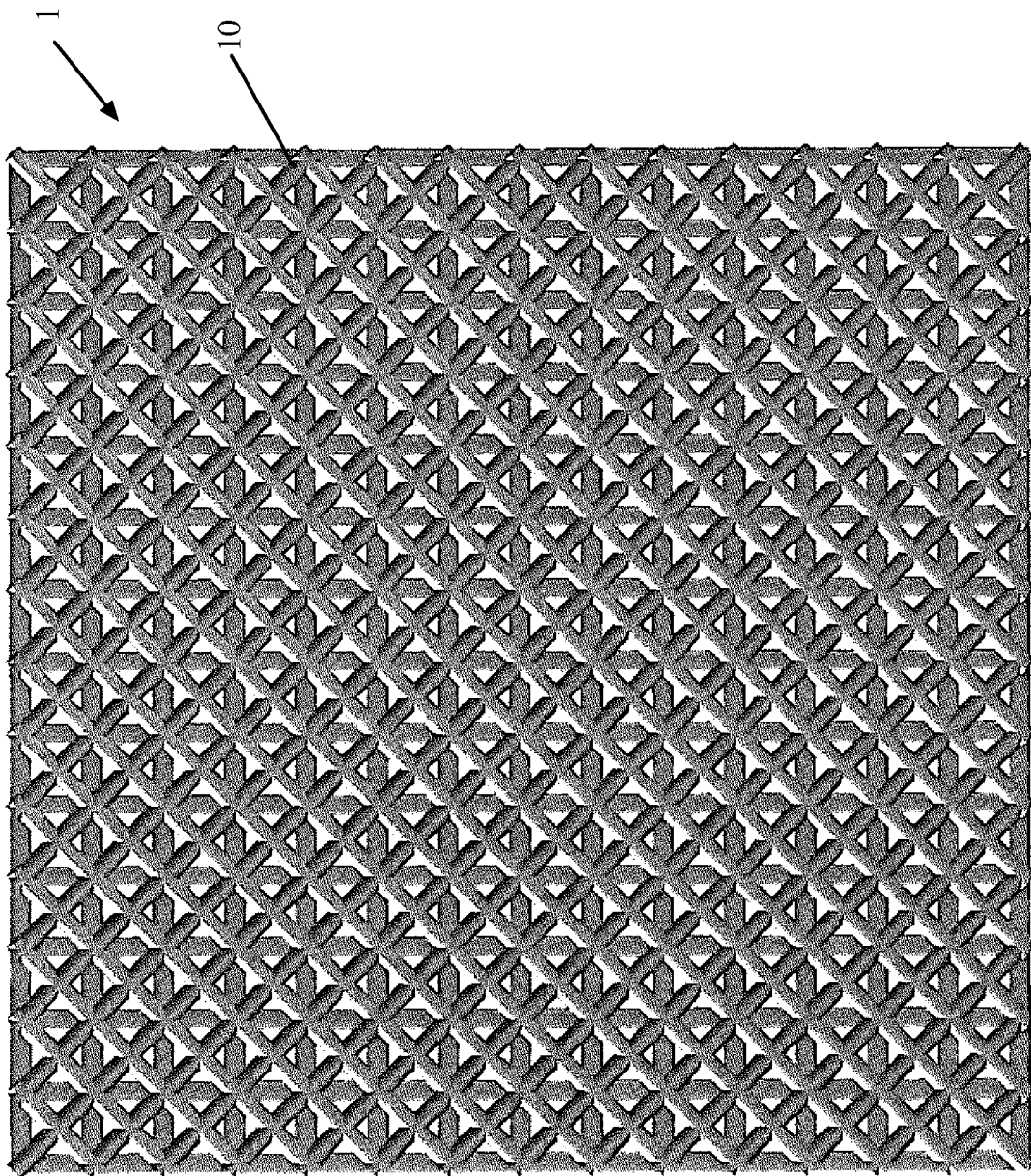
FIG. 1 is a planar view of a papermaking belt according to an exemplary embodiment of the present invention.

The present invention is directed to a process of using three dimensional printing technology (3D-printing) to produce belts intended for use in tissue paper production. The process involves laying down polymers of specific material properties in an additive manner under computer control to create belts with unique structural and topographical profiles.

3D printing is widely use in the automotive industry, engineering, art, architecture and even in research for creating components requiring high level of precision. As conventionally known, the process involves the use of CAD software to generate a model, which is then transferred to process preparation software where the model is virtually disassembled into individual layers. Molds are placed in a virtual build space, and the building process is started. The loose basic material is evenly applied over the entire build width. A print head applies binder where the model is to be produced, whereby the binder infiltrates the recently applied layer and connects it with the layer below. The building platform is lowered and the process starts again. Following the completion of the building process, the loose particle material is removed manually. Once the molds have been cleaned, they can be mounted and prepared for casting.

Current methods for manufacturing papermaking fabrics lack versatility and are limited in their scope. In the current invention, papermaking fabrics are manufactured using any 3D printing techniques and the materials that can be utilized with these 3D printers. This process can be used to manufacture any papermaking fabrics including but not limited to forming, press, belt press, imprinting/structured fabrics, dryer fabrics, sheet support fabrics, or belt press fabric. The main 3D printing techniques include Fused Deposition Modeling™ (commonly known as fused filament fabrication) and PolyJet Technology (Stratasys Ltd, Eden Prairie, Minnesota, USA) which is described below in detail, but other methods such as Selective Laser Melting (SLM), Direct Metal Laser Sintering (DMLS), Selective Laser Sintering (SLS), Stereolithography (SLA), or Laminated Object Manufacturing (LOM) can be utilized. The various materials that can be utilized on these printers are also described below.

A key aspect of this invention is the process of printing the entire belt with at least two different zones. One zone is a vacuum breaking zone that prevents or limits the amount of fibers pulled through the structured tissue pocket. The second zone is the pocket zone. The pocket zone shapes the tissue sheet into the desired three dimensional shapes. Because the entire belt is printed with advanced materials, the total thickness of the bend can be significantly reduced as compared to conventional belts. Such advanced materials includes materials that cannot be used in conventional belt manufacturing due to inherent process limitations. Aspects of the present invention allow alternative materials to be used in unique ways within the context of belt-making processes. For example, individual elements in the belts can be formed with different materials. Specific examples of such elements include a square element having dimensions of 1000 microns×1000 microns with different layers of polymers and elements that have 20 to 40 micro layers of polyethylene, polypropylene, PAE resins, C-F functional group polymers, ect. The elements can be "coated" (i.e., an outer layer can be printed on the element) with different cross-linking polymers (20-40 microns). Such use of unique belt-making materials and dimensions is not possible in conventional processes, such as polymer casting, molding or extrusions.

The present invention allows for the design of belt elements that result in one or more of the following: elimination of the need for lubrications on belts, such as TAD release; use of more of the pocket element without leaving fibers behind (higher bulk with thinner overall fabric; this is particularly important with controlling vacuum and pocket shapes); paper pocket shapes and dimensions that can not be formed by conventional processes due to coefficient of friction and other surface properties of conventional fabrics and belts.

The 3D printing process described herein also allows for printing of a belt with three zones: pocket, vacuum breaker, and valley pocket support zones. The valley pocket support zone prevents the formation of pin holes at the bottom of each pocket which helps to control air permeability, tissue pocket formation and fiber pocket delamination.

A four layer belt can also be formed with pocket, vacuum breaker, valley pocket support and shear modulus control zones. The shear modulus control zone enables the entire belt to flex over CD and MD directions to prevent belt failure. This zone allow the belt to compress without changing pocket dimensions, and it allows the belt to flex in shear directions. The shear modulus control zone may be formed by selective deposition of polymers selected to match structural requirements for this zone. The printing process allows for mixing of material between zones to ensure continuation of load stresses across the matrix. This invention provides an entire belt in a homogenous and unitary form that significantly improves fabric life and paper properties. It should be appreciated that the number and arrangement of zones of the inventive 3D printed belt is not limited to those described herein, and other than a pocket zone, no other zones are specifically required The current invention also allows for the production of seamed and non-seamed belts. Seams used in conventional belt design (lock or key and pin joints) can be used, but non-seamed belts may also be formed in which the belt is printed continuously in the Z direction (i.e., in an additive manner).

Figure 2:
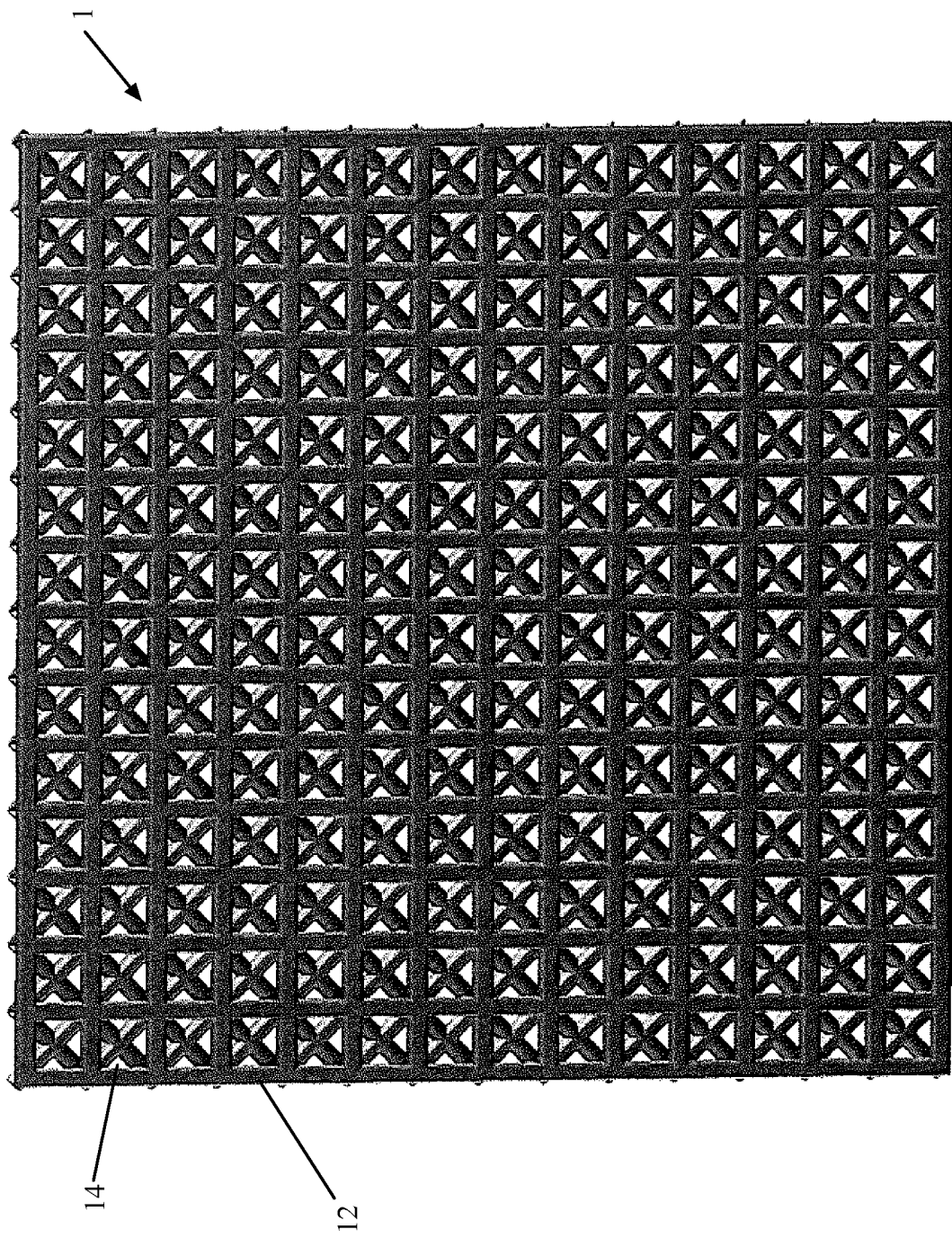
FIG. 2 is another planar view of the papermaking belt of FIG. 1.

FIGS. 1 and 2 are planar views of a portion of a papermaking fabric, generally designated by reference number 1, according to an exemplary embodiment of the present invention. The fabric 1 is made using a 3D printing process and in particular the entire fabric 1 is printed with at least two different zones that are laid on top of one another during the printing process. For the purposes of the present invention, the term "zone" is defined as a section of the fabric that extends continuously (with our without openings) across the length and width of the fabric and at least partially through the thickness of the fabric, where each zone is configured to provide the fabric with a corresponding performance characteristic. In an exemplary embodiment, one zone is a vacuum breaking zone 10 (shown facing upwards in FIG. 1) which prevents or limits the amount of fibers pulled through the structured tissue pocket, and another zone is a pocket zone 12 (facing upwards in FIG. 2) which includes a plurality of pockets 14. The pockets 14 shape the tissue sheet into the desired three dimensional shapes. Because the entire belt is printed with advanced materials, the total thickness of the belt can be significantly reduced. In exemplary embodiments, the fabric 1 may have more than two zones, and in a particular embodiment has multiple (i.e., two or more) vacuum breaker zones and a structured tissue pocket zone.

As shown in FIGS. 1 and 2, the vacuum breaking zone 10 and pocket zone 12 are each made up of a crisscross pattern of material. The pattern of the vacuum breaking zone 10 is angled relative to the pocket zone 12 so that vacuum breaker elements cross under the pocket layer at or near the center of a corresponding pocket 14. In an exemplary embodiment, the elements of the vacuum breaking zone 10 are cylindrical shaped so as to present curved edges at the point of contact with a vacuum box within the papermaking manufacturing line. The thickness of the vacuum breaking zone 10 preferably makes up less than 50% of the total thickness of the fabric 1 as measured in cross section, and more preferably makes up less than 30% of the total thickness. In an exemplary embodiment, the vacuum breaker zone 10 has a surface energy within the range of 37 to 60 dyne/cm.

Although the open areas or pockets 14 of the pocket zone 12 are shown in FIGS. 1 and 2 with a generally square shape, it should be appreciated that the pockets 14 may have any other suitable shape, including, for example, oval or diamond shapes. In this regard, the pockets 14 may have straight or curved edges. In an exemplary embodiment, the pocket zone open areas are formed by raised elements each with a cross section having a generally curved or dome-like shape. Also, in an exemplary embodiment, the pocket zone 12 has a surface energy within the range of 16 to 36 dyne/cm.

In an exemplary embodiment, the entire fabric 1 has a caliper less than 1 mm. The caliper of the fabric 1 is reduced less than 5% after 350,000 cycles under a press load of 20 to 100 kN/m.

The papermaking fabric 1 is made using a 3D printing process that lays down successive layers or zones of material. Each layer has a thickness within the range of 1 to 1000 microns, and preferably within the range of 7 to 200 microns. The materials used in each layer may be composed of polymers with a Young's Modulus within the range of 10 to 500 MPa, and preferably 40 to 95 MPa. Such polymers may include nylons, aramids, polyesters such as polyethylene terephthalate or polybutyrate, or combinations thereof.

In an exemplary embodiment, the open area of the fabric 1 (i.e., the amount of air in the fabric as compared to amount of polymer) may be within the range of 10 to 95 percent, and preferably within the range of 40 to 60 percent. The air permeability of the fabric 1 may be in the range of 100 to 1000 cubic feet per minute, and preferably within the range of 400 to 700 cubic feet per minute.

In an exemplary embodiment, the width of the fabric 1 may be within the range of 40 to 400 inches, and preferably within the range of 200 to 240 inches. The caliper of the fabric 1 may be within the range of 0.25 to 4.00 mm, and preferably within the range of 0.75 to 1.5 mm.

Figure 3A:
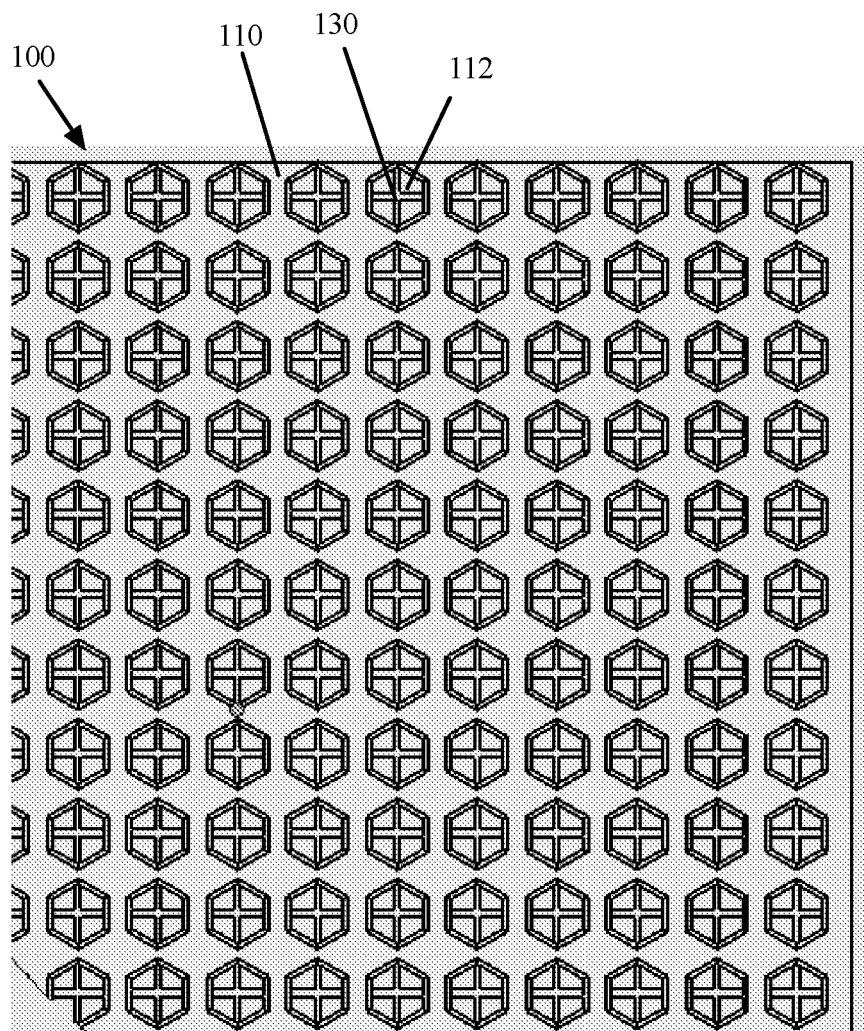
FIG. 3A is planar view of a papermaking belt according to an exemplary embodiment of the present invention.
Figure 3B:
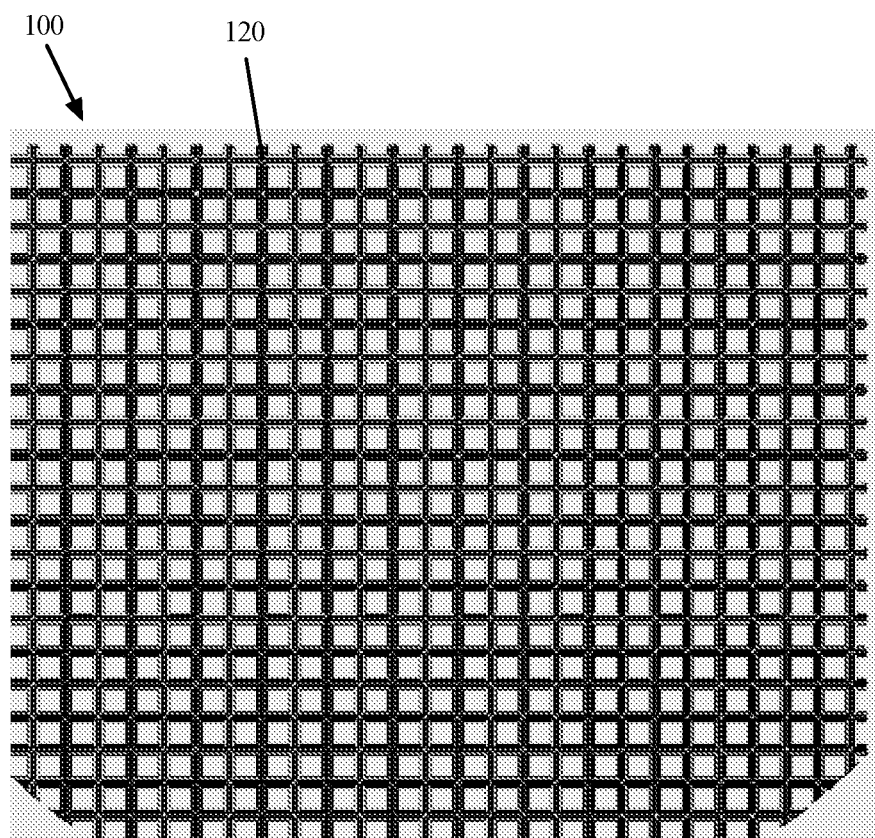
FIG. 3B is another planar view of the papermaking belt of FIG. 3A.

FIGS. 3A and 3B are planar views of a fabric, generally designated by reference number 100, according to another exemplary embodiment of the present invention. As in the previous embodiment, the fabric 100 is manufactured by a 3D printing process in which successive zones of material are laid down to form a unitary fabric structure. The fabric 100 includes a vacuum breaking zone 120 (shown facing upwards in FIG. 3B) and a pocket zone 110 (facing upwards in FIG. 3A) which includes a plurality of pockets 112. Further, a valley pocket support zone 130 is formed at the bottom of each pocket 112. The valley pocket support zone 130 may be formed as elements that together form a separate layer below the pocket zone 110 or the individual elements may form the bottom surface of the pocket zone 112. The valley pocket support zone 130 may be formed of a material that is different from the material used to form the pocket zone 112 and which provides specific structural advantages. For example, the valley pocket support zone 130 may prevent the formation of pin holes at the bottom of each pocket 112 which helps to control air permeability, tissue pocket formation and fiber pocket delamination.

Figure 4:
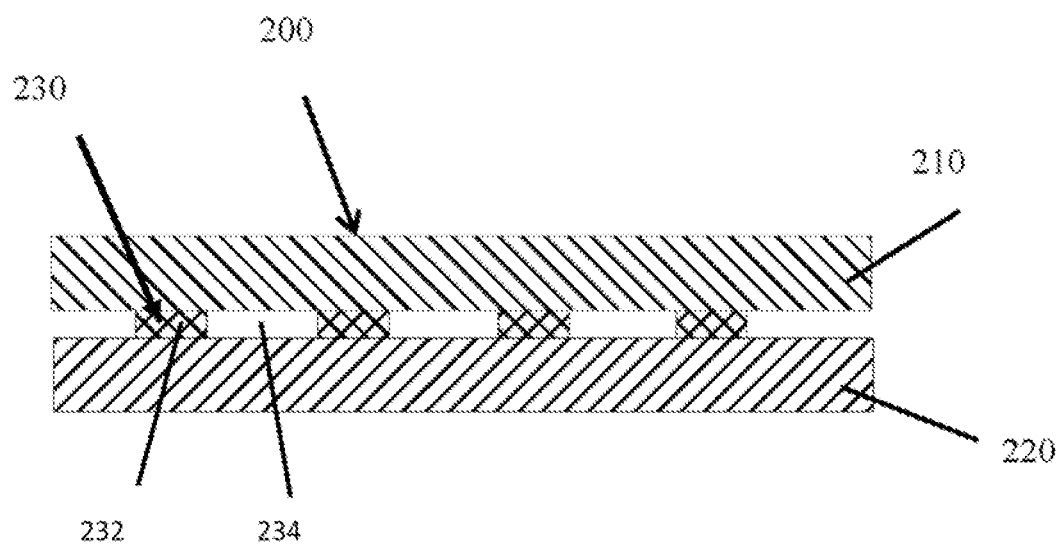
FIG. 4 is a cross-sectional view of a papermaking belt according to an exemplary embodiment of the present invention.

FIG. 4 is a cross sectional view of a fabric, generally designated by reference number 200, according to another exemplary embodiment of the present invention. As in the previous embodiments, the fabric 200 is manufactured by a 3D printing process in which successive zones of material are laid down to form a unitary fabric structure. The fabric 200 includes a vacuum breaking zone 220 and a pocket zone 210 which includes a plurality of pockets (not shown). Further, the fabric 200 includes a shear modulus control zone 230 disposed between the pocket zone 210 and the vacuum breaking zone 220. As shown in FIG. 4, the shear modulus control zone 230 includes solid portions 232 spaced apart by relatively larger openings 234 which allow for the entire fabric 200 (as a unitary structure) to compress with little to no change in pocket dimensions and to flex in shear directions to prevent fabric failure.

In exemplary embodiments, the fabric is preferably made using Fused Deposition Modeling™ (FDM), also known as fused filament fabrication, or Polyjet Technology.

Fused Deposition Modeling™ (FDM) builds concept models, functional prototypes and end-use parts in standard, engineering-grade and high-performance thermoplastics. 3D printers that run on FDM Technology build parts layer-by-layer by heating thermoplastic material to a semi-liquid state and extruding it according to computer-controlled paths. Thermoplastic filament feeds through a heated head and exits, under high pressure, as a fine thread of semi-molten plastic. In a heated chamber, this extrusion process lays down a continuous bead of plastic to form a layer. This layering process repeats to manufacture thermoplastic parts. FDM uses two materials to execute a print job: modeling material, which constitutes the finished piece, and support material, which acts as scaffolding. Material filaments are fed from the 3D printer's material bays to the print head, which moves in X and Y coordinates, depositing material to complete each layer before the base moves down the Z axis and the next layer begins. Once the 3D printer is done building, the user breaks the support material away or dissolves it in detergent and water, and the part is ready to use. The benefits of FDM are: simple-to-use, office-friendly 3D printing process. Thermoplastic parts can endure exposure to heat, chemicals, humid or dry environments, and mechanical stress. Soluble support materials make it possible to produce complex geometries and cavities that would be difficult to build with traditional manufacturing methods.

PolyJet 3D printing is similar to inkjet document printing, but instead of jetting drops of ink onto paper, PolyJet 3D printers jet layers of liquid photopolymer onto a build tray and cure them with UV light. A carriage—with four or more inkjet heads and ultraviolet (UV) lamps—traverses the work space, depositing tiny droplets of photopolymers, materials that solidify when exposed to UV light. After printing a thin layer of material, the process repeats until a complete 3D object is formed. Fully cured models can be handled and used immediately, without additional post-curing. Along with the selected model materials, the 3D printer also jets a gel-like support material specially designed to uphold overhangs and complicated geometries. It is easily removed by hand and with water. PolyJet 3D printing technology has many advantages for rapid prototyping, including superior quality and speed, high precision, and a very wide variety of materials. The benefits of PolyJet technology create precision prototypes that set the standard for finished-product realism. It's very thin print layers make complex shapes, fine details and smooth finished surfaces possible.

PolyJet offers product realism across a wide band of requirements. There are over 450 options offering a range of hues, transparency, strength, rigidity and flexibility. For FDM material options range from the commonly used plastic to the highly advanced resin. Material options include: anti-static, FST rating (flame, smoke and toxicity), chemical resistance and very high temperature resistance. Both FDM and PolyJet offer bio-compatible materials with USP Plastic Class VI to ISO 10993 ratings.

Figure 5A:
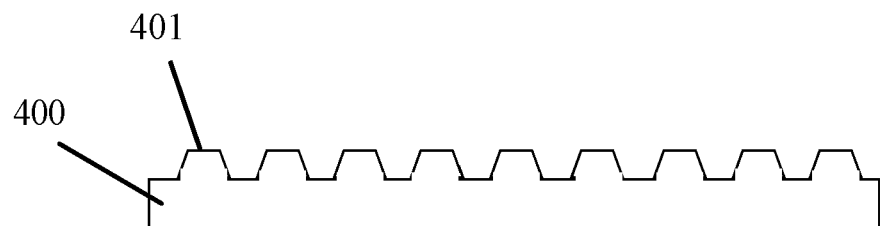
FIGS. 5A-5C are cross-sectional views showing various steps of a method of forming a papermaking belt according to an exemplary embodiment of the present invention.
Figure 5B:
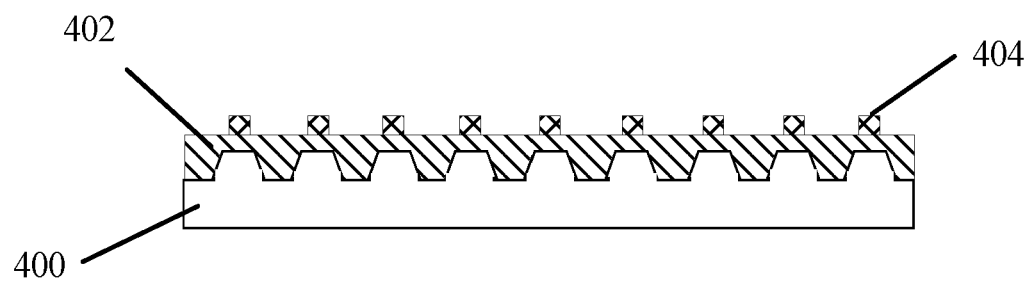
Figure 5C:
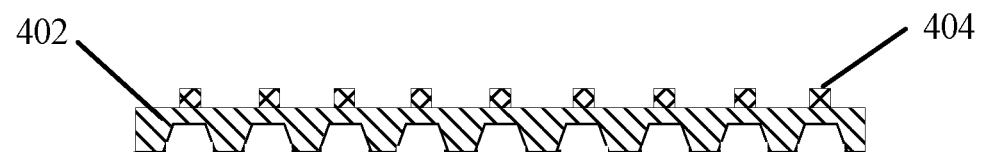

FIGS. 5A-5C are cross-sectional views showing a method of forming a papermaking belt according to an exemplary embodiment of the present invention. After the computer modeling is completed, as shown in FIG. 5A, an initial layer of material is extruded or printed to form a support or scaffolding layer 400. The scaffolding layer 400 is intended to be a sacrificial layer that is later removed from the finished belt and which has the purpose of supporting subsequent layers that are successively layered over or adjacent to the scaffolding layer 400. In an exemplary embodiment, the scaffolding layer 400 may include protrusions 401 that form the pockets in the pocket zone to be subsequently printed over the scaffolding layer 400. The scaffolding layer 400 may be formed with other protrusions and/or indentations as needed to aid in the formation of complementary structural elements in subsequently printed layers. It should be appreciated that the scaffolding layer is not necessary, and in other exemplary embodiments the papermaking belt may be 3D printed without the use of a scaffolding layer. In exemplary embodiments, gel material (e.g., acrylic acid polymer gel) may be used to support the pocket and other structures formed in the belt to prevent the structures from collapsing before they are cured.

As shown in FIG. 5B, a second layer of material is printed or extruded over the scaffolding layer 400 to form a pocket zone 402. The pocket zone 402 includes pockets that conform to the protrusions 401 extending from the scaffolding layer 400, as well any other structures complementary to those formed in the scaffolding layer 400.

As also shown in FIG. 5B, a third layer of material is printed or extruded over the pocket zone 402 to form another layer, such as, for example, a vacuum breaker zone 404. In other embodiments, a shear modulus control zone and/or a valley pocket support zone may be layered onto the pocket zone 402 prior to printing of the vacuum breaker zone 404. In general, various layers are successively printed so as to form an integral and unitary structure in the form of a papermaking belt.

As shown in FIG. 5C, the scaffolding layer 400 is removed to expose the finished papermaking belt structure. Any suitable technique may be used to remove the scaffolding layer 400 (and other support layers that were required during the build process) including, for example, manual removal, water jet and/or a chemical bath (for example, a bath of sodium hydroxide).

While particular embodiments of the invention have been illustrated and described, it would be obvious to those skilled in the art that various other changes and modifications may be made without departing from the spirit and scope of the invention. It is therefore intended to cover in the appended claims all such changes and modifications that are within the scope of this invention.

The invention claimed is:

1. A three-dimensional papermaking belt configured for use in forming, pressing, drying or molding of fibrous web, comprising:
zones of material laid down successively using a 3D printing process, the zones comprising:
a plurality of vacuum breaking zones configured to limit an amount of paper fibers pulled through open areas formed in the belt, wherein each vacuum breaking zone comprises at least two material elements that are overlapping and disposed within a respective one of the open areas.

2. The three-dimensional papermaking belt of claim 1, wherein the papermaking belt is configured for use on a through air dried or un-creped through air dried papermaking machine.

3. The three-dimensional papermaking belt of claim 1, wherein the 3D printing comprises Fused Deposition Modeling (FDM) or PolyJet Technology.

4. The three-dimensional papermaking belt of claim 1, wherein the 3D printing comprises laying down successive layers of material.

5. The three-dimensional papermaking belt of claim 4, wherein the layers have a thickness of 1 to 1000 microns.

6. The three-dimensional papermaking belt of claim 4, wherein the layers have a thickness of 7 to 200 microns.

7. The three-dimensional papermaking belt of claim 1, wherein the material is polymeric material, and the polymeric material comprises nylons, aramids, polyesters or combinations thereof.

8. The three-dimensional papermaking belt of claim 7, wherein the polyesters comprise polyethylene terephthalate or polybutyrate.

9. The three-dimensional papermaking belt of claim 1, wherein the papermaking belt is of a type selected from the group consisting of: forming fabric, press fabric, belt press fabric, imprinting/structured fabric, dryer fabric and sheet support fabric.

10. The three-dimensional papermaking belt of claim 1, wherein the papermaking belt has a width of 40 to 400 inches.

11. The three-dimensional papermaking belt of claim 10, wherein the papermaking belt has a width of 200 to 240 inches.

12. The three-dimensional papermaking belt of claim 1, wherein the papermaking belt has a caliper of 0.25 to 4.00 mm.

13. The three-dimensional papermaking belt of claim 12, wherein the papermaking belt has a caliper of 0.75 to 1.5 mm.

14. The three-dimensional papermaking belt of claim 1, wherein the papermaking belt has a total open area of 10 to 95 percent.

15. The three-dimensional papermaking belt of claim 14, wherein the papermaking belt has a total open area of 40 to 60 percent.

16. The three-dimensional papermaking belt of claim 1, wherein the papermaking belt has an air permeability of 100 to 1000 cubic feet per minute as tested in accordance with ASTM D737-96.

17. The three-dimensional papermaking belt of claim 16, wherein the papermaking belt has an air permeability of 400 to 700 cubic feet per minute as tested in accordance with ASTM D737-96.

18. The three-dimensional papermaking belt of claim 1, wherein the zones further comprise a pocket zone configured to form three dimensional structures in a paper web.

19. The three-dimensional papermaking belt of claim 18, wherein the zones further comprise a valley pocket support zone configured to support pockets formed in the pocket zone.

20. The three-dimensional papermaking belt of claim 1, wherein the vacuum breaking zone has a thickness less than 50% of a total thickness of the papermaking belt as measured in cross section.

* * * * *